US012498096B2

(12) United States Patent
Chikama

(10) Patent No.: US 12,498,096 B2
(45) Date of Patent: Dec. 16, 2025

(54) VEHICLE LAMP

(71) Applicant: Stanley Electric Co., Ltd., Tokyo (JP)

(72) Inventor: Hiroyuki Chikama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/710,106

(22) PCT Filed: Oct. 25, 2022

(86) PCT No.: PCT/JP2022/039688

§ 371 (c)(1),
(2) Date: May 14, 2024

(87) PCT Pub. No.: WO2023/090073

PCT Pub. Date: May 25, 2023

(65) Prior Publication Data

US 2025/0003567 A1 Jan. 2, 2025

(30) Foreign Application Priority Data

Nov. 17, 2021 (JP) ................................ 2021-186961

(51) Int. Cl.
*F21S 43/33* (2018.01)
*F21S 43/31* (2018.01)

(52) U.S. Cl.
CPC ............ *F21S 43/332* (2024.05); *F21S 43/31* (2018.01)

(58) Field of Classification Search
CPC ............... F21S 41/147–365; F21S 43/14–332
See application file for complete search history.

(56) References Cited

U.S. PATENT DOCUMENTS

| | | | | |
|---|---|---|---|---|
| 6,945,672 B2 * | 9/2005 | Du | ......................... | F21V 31/04 257/E33.072 |
| 7,513,642 B2 * | 4/2009 | Sormani | .............. | F21S 41/151 362/800 |
| 2013/0135889 A1 * | 5/2013 | Okubo | ................. | F21S 41/148 362/518 |
| 2015/0308650 A1 | 10/2015 | De Kievit et al. | | |
| 2016/0377253 A1 | 12/2016 | Matsumoto et al. | | |

(Continued)

FOREIGN PATENT DOCUMENTS

| | | |
|---|---|---|
| CN | 110594694 A | 12/2019 |
| DE | 102019108995 A1 | 10/2020 |

(Continued)

OTHER PUBLICATIONS

International Search Report for PCT/JP2022/039688 dated Dec. 27, 2022.

(Continued)

*Primary Examiner* — Jason M Han
(74) *Attorney, Agent, or Firm* — KENEALY VAIDYA LLP

(57) ABSTRACT

A vehicle lamp includes a light source, and a reflector including a diffusion/reflection surface configured to diffuse and reflect light emitted from the light source toward a front surface side, the diffusion/reflection surface has a curved surface shape that forms a curve according to directionality of the light emitted from the light source in a cross section in at least one direction along an optical axis of the light emitted from the light source.

14 Claims, 17 Drawing Sheets

(56) References Cited

U.S. PATENT DOCUMENTS

| | | | |
|---|---|---|---|
| 2017/0113605 | A1 | 4/2017 | Daicho et al. |
| 2018/0290587 | A1 | 10/2018 | Fimeri et al. |
| 2021/0123580 | A1 | 4/2021 | Yatabe |

FOREIGN PATENT DOCUMENTS

| | | | |
|---|---|---|---|
| JP | H05-170029 | A | 7/1993 |
| JP | 2010-527112 | A | 8/2010 |
| JP | 2011-154913 | A | 8/2011 |
| JP | 2013-127842 | A | 6/2013 |
| JP | 2013-533595 | A | 8/2013 |
| JP | 2017-010858 | A | 1/2017 |
| JP | 2017-212070 | A | 11/2017 |
| JP | 2018-018625 | A | 2/2018 |
| JP | 2018-101626 | A | 6/2018 |
| JP | 2019-204616 | A | 11/2019 |
| JP | 2021-072191 | A | 5/2021 |
| WO | 2008/140884 | A1 | 11/2008 |
| WO | 2012/004724 | A1 | 1/2012 |
| WO | 2016/006699 | A1 | 1/2016 |

OTHER PUBLICATIONS

Extended European seach report for the corresponding European patent application No. 22895357.6 dated Sep. 29, 2025.

* cited by examiner

VEHICLE LAMP

This application is a U.S. National Stage Application under 35 U.S.C § 371 of International Patent Application No. PCT/JP2022/039688 filed Oct. 25, 2022, which claims the benefit of priority under 35 U.S.C. § 119 to Japanese Patent Application No. 2021-186961 filed Nov. 17, 2021, the disclosures of all of which are hereby incorporated by reference in their entireties.

TECHNICAL FIELD

The present invention relates to a vehicle lamp.

BACKGROUND ART

For example, a vehicle lamp mounted on a vehicle has a configuration in which a light source and a reflector configured to reflect light emitted from the light source toward a front surface side are disposed inside a lighting body (for example, see the following Patent Document 1).

Incidentally, in recent years, as the luminance of light emitting diodes (LEDs) has increased and the cost thereof has decreased, the number of vehicle lamps employing LEDs in a light source has increased. Meanwhile, LEDs have a merit of long life and low power consumption, but LEDs also have directionality of emitting light in a Lambertian manner. That is, while LEDs have high directionality (straightness), they also have directionality in which light is unlikely to diffuse.

For this reason, in the vehicle lamp in the related art, when light with strong directionality, such as from an LED, enters a reflecting surface of a reflector, it is greatly affected by the directionality of the LED. Specifically, the reflecting surface of the reflector is constituted by a parabolic reflecting surface that is formed to form a parabola with its focus at a center (emission point) of the light source.

In this case, the reflector parallelizes (collimates) and reflects light entering the parabolic reflecting surface toward the front surface side. For this reason, it becomes difficult to uniformly reflect the light entering the reflecting surfaces having different distances from the light source toward the front surface side.

In the invention disclosed in the following Patent Document 1, to solve this problem, a diffusion lens is placed in front of the reflector, and light reflected by the reflector is diffused by the diffusion lens to obtain uniform light emission.

CITATION LIST

Patent Document

[Patent Document 1]
Japanese Unexamined Patent Application, First Publication No. 2018-101626

SUMMARY OF INVENTION

Technical Problem

However, in the invention disclosed in the above-mentioned Patent Document 1, since the diffusion lens is needed, there is a problem in that the cost increases due to the increase in the number of parts.

An aspect of the present invention is directed to providing a vehicle lamp capable of obtaining more uniform emission while increase in the number of parts is suppressed.

Solution to Problem

In order to achieve the aforementioned objects, the present invention provides the following configurations.

(1) A vehicle lamp including:
- a light source; and
- a reflector including a diffusion/reflection surface configured to diffuse and reflect light emitted from the light source toward a front surface side,
- wherein the diffusion/reflection surface has a curved surface shape that forms a curve according to directionality of light emitted from the light source in a cross section in at least one direction along an optical axis of the light emitted from the light source.

(2) The vehicle lamp according to the above-mentioned (1), wherein the diffusion/reflection surface has a curved surface shape that forms a curve in which a distance from the light source increases as a light intensity according to an emission angle of the light emitted from the light source increases in a cross section of at least one direction along an optical axis of the light emitted from the light source.

(3) The vehicle lamp according to the above-mentioned (1) or (2), wherein the diffusion/reflection surface has a curved surface shape that forms an arc about an optical axis of the light emitted from the light source or a curved surface shape that forms a curve approximate to the arc in a cross section in other direction which is perpendicular to the optical axis and which is perpendicular to the one direction.

(4) The vehicle lamp according to any one of the above-mentioned (1) to (3), wherein directionality of the light emitted from the light source is a Lambertian light distribution, and
- the diffusion/reflection surface has a curved surface shape that forms a cosine curve in a cross section of at least one direction along the optical axis of the light emitted from the light source.

(5) The vehicle lamp according to any one of the above-mentioned (1) to (4), wherein the reflector is constituted by a reflection member having a light diffusion property.

(6) The vehicle lamp according to any one of the above-mentioned (1) to (5), wherein the diffusion/reflection surface includes a fine concavo-convex structure.

(7) The vehicle lamp according to any one of the above-mentioned (1) to (6), including a subsidiary reflector including a reflecting surface configured to reflect some of the light emitted from the light source toward the diffusion/reflection surface.

(8) The vehicle lamp according to the above-mentioned (7), wherein the reflecting surface reflects some of the light directed toward the front surface side with respect to the optical axis toward the diffusion/reflection surface located on a back surface side with respect to the optical axis.

(9) The vehicle lamp according to any one of the above-mentioned (1) to (8), wherein the plurality of light sources are arranged side by side,
- the reflector includes the plurality of diffusion/reflection surfaces corresponding to the light sources, respectively, and
- the diffusion/reflection surfaces are provided continuously in a direction in which light sources are arranged.

Advantageous Effects of Invention

According to the aspect of the present invention, it is possible to provide a vehicle lamp capable of obtaining more uniform emission while suppressing an increase in the number of parts.

DESCRIPTION OF EMBODIMENTS

Figure 1:
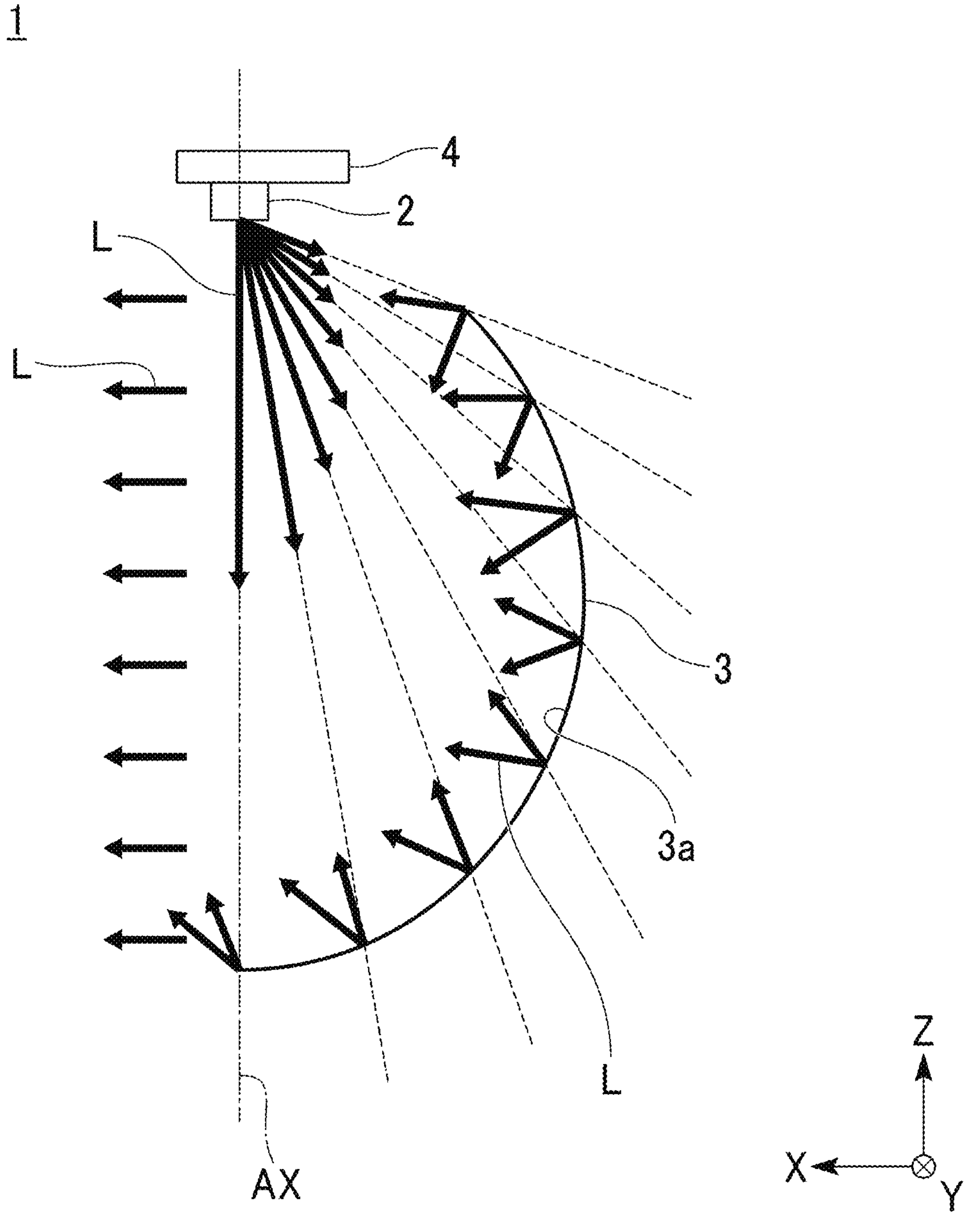
FIG. 1 is a cross-sectional view of a vehicle lamp according to a first embodiment of the present invention in a vertical direction.

Hereinafter, embodiments of the present invention will be described with reference to the accompanying drawings.

Further, in the drawings used in the following description, in order to make each component easier to see, dimensions may be shown at different scales depending on the component, and dimensional ratios in respective components may not be the same as in reality.

First Embodiment

First, as a first embodiment of the present invention, for example, a vehicle lamp 1 shown in FIG. 1 to FIG. 4 will be described.

Figure 2A:
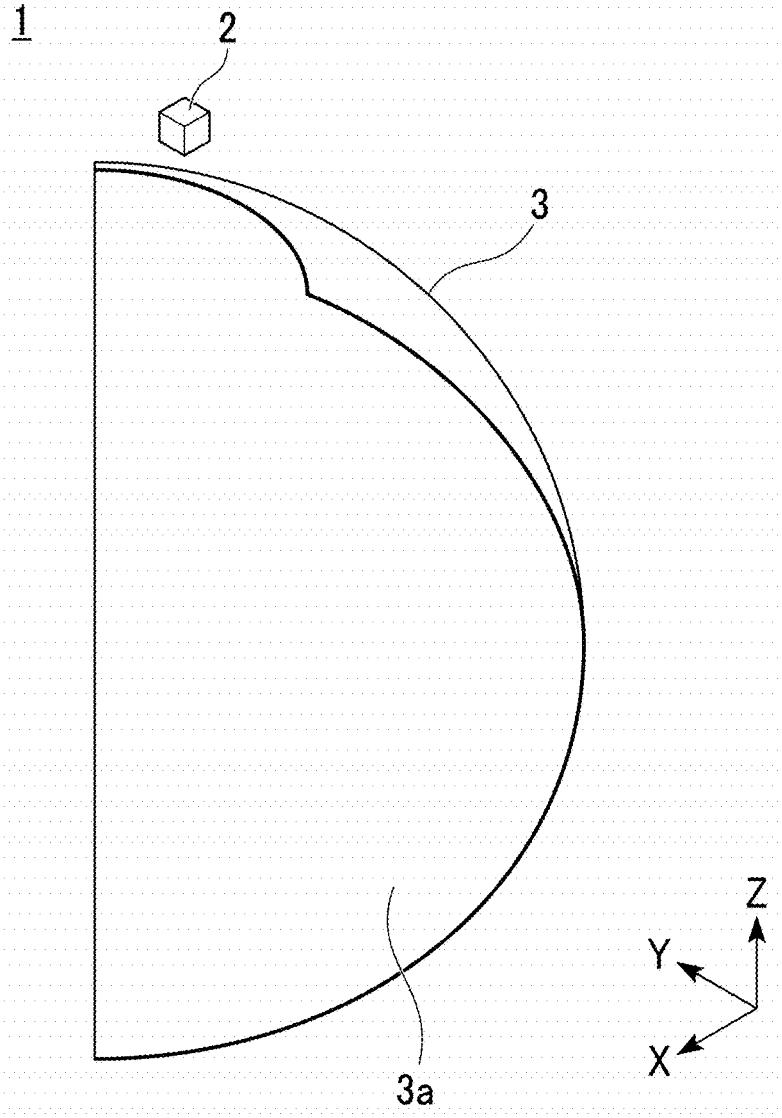
FIG. 2A is a perspective view showing a configuration of a reflector provided in the vehicle lamp shown in FIG. 1.
Figure 2B:
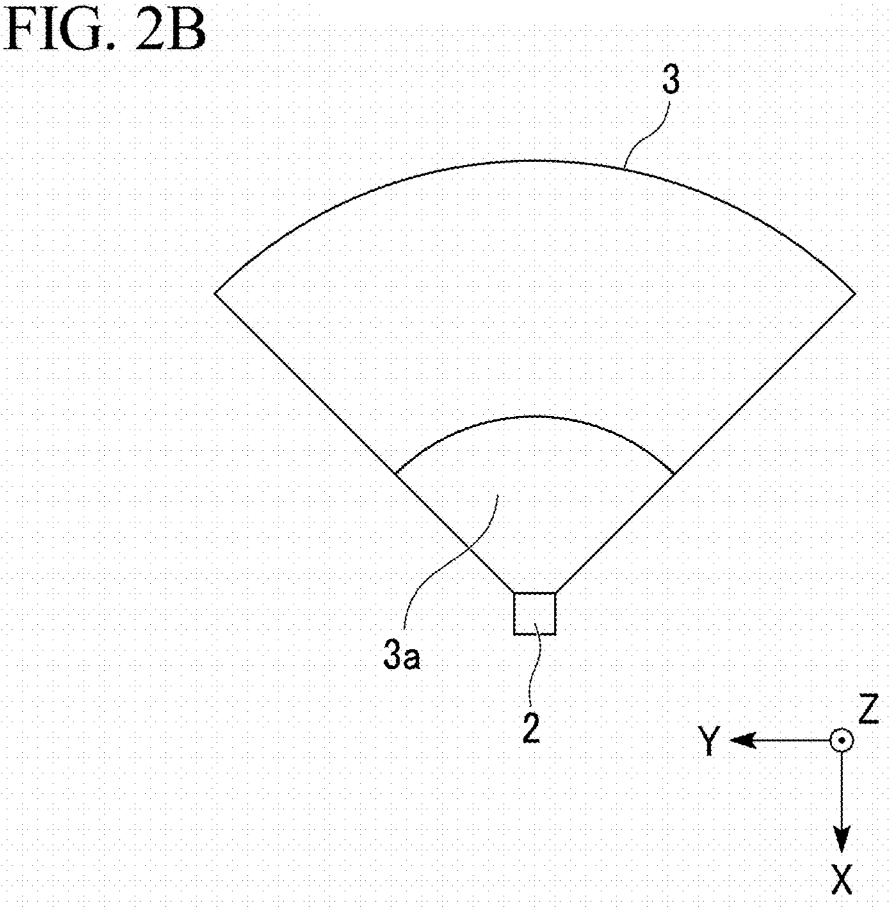
FIG. 2B is a plan view when the perspective view of the configuration of the reflector shown in FIG. 2A is seen from above.
Figure 3:
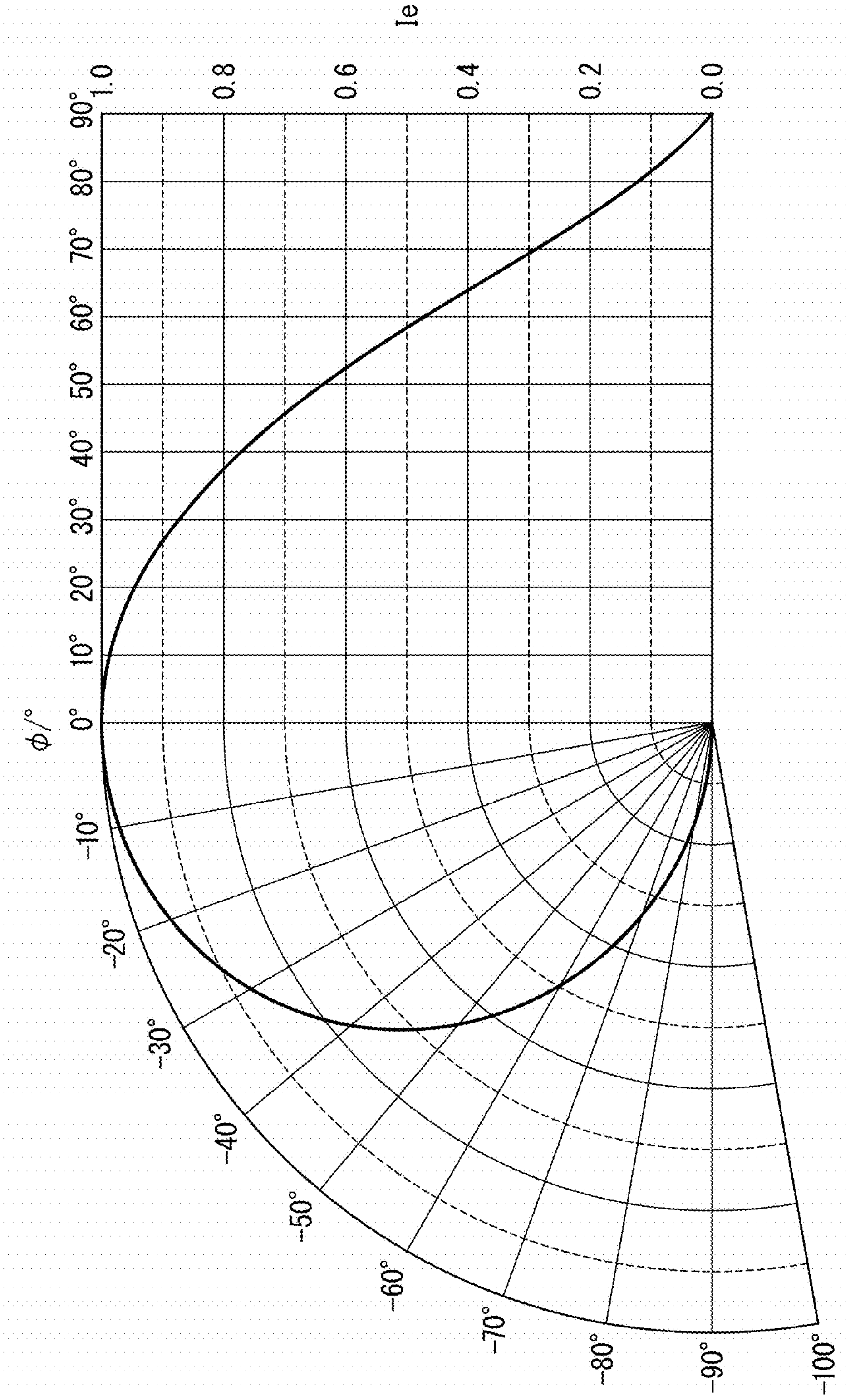
FIG. 3 is a graph showing directionality of light emitted from a light source on polar coordinates and orthogonal coordinates.
Figure 4:
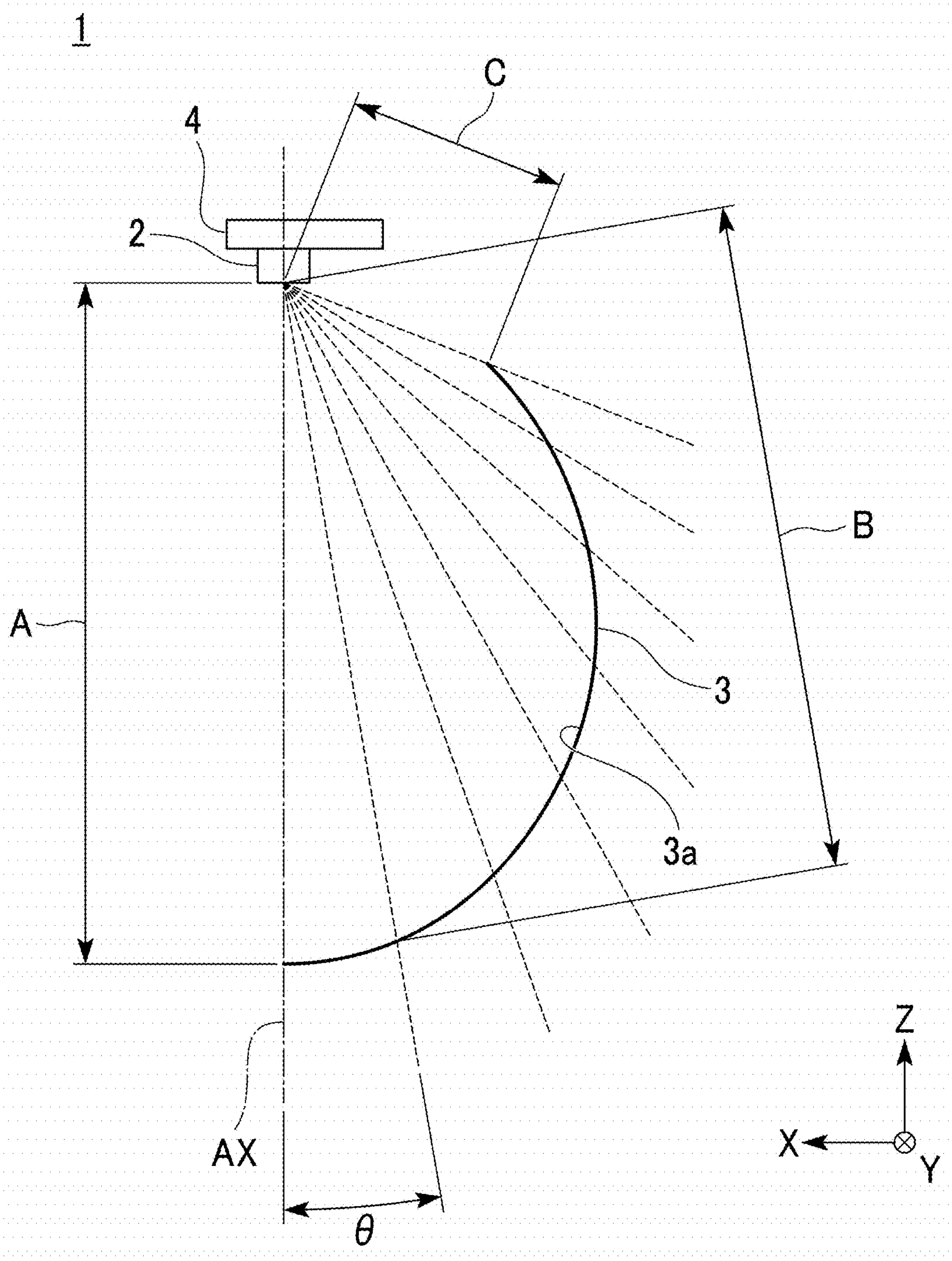
FIG. 4 is a cross-sectional view for describing a shape of a diffusion/reflection surface of the reflector.

Further, FIG. 1 is a cross-sectional view of the vehicle lamp 1 in a vertical direction. FIG. 2A is a perspective view of a configuration of a reflector 3 provided in the vehicle lamp 1, and FIG. 2B is a plan view when the perspective view of the configuration of the reflector shown in FIG. 2A is seen from above. FIG. 3 is a graph showing directionality of light emitted from a light source 2 on polar coordinates and orthogonal coordinates. FIG. 4 is a cross-sectional view for describing a shape of a diffusion/reflection surface 3*a* of the reflector 3.

In addition, in the drawings described below, an XYZ orthogonal coordinates system is set, an X-axis direction indicates a forward/rearward direction (a lengthwise direction) of the vehicle lamp 1, a Y-axis direction indicates a leftward/rightward direction (a widthwise direction) of the vehicle lamp 1, and a Z-axis direction indicates an upward/downward direction (a height direction) of the vehicle lamp 1.

As shown in FIG. 1 and FIG. 2, the vehicle lamp 1 of the embodiment is obtained by applying the present invention to tail lamps configured to emit red light, in rear combination lamps mounted on both corner portions of a rear end side of a vehicle (not shown) (in the embodiment, a corner portion on a left rear end side).

Further, in the following description, terms of "forward," "rearward," "leftward," "rightward," "upward" and "downward" refer to the respective directions when, the vehicle lamp 1 is viewed from the front (a side behind the vehicle) unless the context indicates otherwise. Accordingly, when looking at the vehicle from the front (a side in front of the vehicle), each direction is the opposite of the above-mentioned forward, rearward, leftward and rightward.

As shown in FIG. 1, FIG. 2A and FIG. 2B, the vehicle lamp 1 of the embodiment includes the light source 2 and the reflector 3, and is disposed inside a lighting body (not shown) that constitutes a rear combination lamp.

Further, the lighting body is constituted by a housing with a front surface opening, and an outer lens (a cover lens) configured to cover the opening of the housing. In addition, a shape of the lighting body can be appropriately changed according to a design or the like of the vehicle.

The light source 2 is constituted by a light emitting diode (LED) configured to emit red light (hereinafter, referred to as "light") L. The light source 2 is mounted on a side of one surface (in the embodiment, a lower surface) of a circuit board 4 on which a driving circuit configured to drive the LED is provided. Accordingly, the light source 2 radially emits the light L in a direction perpendicular to the one surface of the circuit board 4 (in the embodiment, downward).

The reflector 3 is disposed below the light source 2, and has the diffusion/reflection surface 3*a* configured to diffuse and reflect the light L emitted from the light source 2 toward a front surface side. For example, a reflection member having a light diffusion property such as a white glass epoxy resin or the like is used for the reflector 3. In addition, particles such as titanium oxide or the like contained in a white reflection member has a function of diffusing light. In addition, for example, the diffusion/reflection surface 3*a* is composed of a reflecting surface including a fine concavo-convex structure for randomly diffusing the light L such as embossing or the like.

Incidentally, in the vehicle lamp 1 of the embodiment, the diffusion/reflection surface 3*a* of the reflector 3 has a curved surface shape that forms a curve according to directionality of the light L emitted from the light source 2 in a cross section (hereinafter, referred to as "a vertical cross section") in at least one direction (in the embodiment, a vertical direction of the reflector 3) along an optical axis AX of the light L emitted from the light source 2.

Specifically, the diffusion/reflection surface 3*a* has a curved surface shape that forms a curve in which a distance from the light source 2 increases as a light intensity according to an emission angle of the light L emitted from the light source 2 increases in a vertical cross section.

Here, the directionality of the light L emitted from the light source 2 is a Lambertian light distribution as shown in FIG. 3. The Lambertian light distribution is a light distribution in which an emission angle θ of the light L with respect to the optical axis AX can be expressed by a multiple of cos θ of the light intensity on the optical axis AX (θ=0°). Accordingly, an emission angle (half-value angle) that is a half value of the light intensity of the optical axis AX is θ=60° from cos θ=0.5.

As shown in FIG. 4, in the vertical cross section, the diffusion/reflection surface 3*a* is constituted by a concave curved surface that forms a cosine curve according to the Lambertian light distribution throughout an angle range in which the emission angle θ is at least 0° to 60° (in the embodiment, 0° to 80°) and that is located on a back surface side with respect to the optical axis AX of the light L emitted from the light source 2.

That is, the cosine curve is a curve expressed by the following equation (1) in a case provided that a distance A is a distance from the light source 2 to the diffusion/reflection surface 3*a* when the emission angle θ is 0° and a distance B is a distance from the light source 2 to the diffusion/reflection surface 3*a* when the emission angle is θ.

$$B = A\cos\theta \tag{1}$$

Further, the light intensity of the light L at the position where the emission angle θ is 0° (a lower end of the diffusion/reflection surface 3*a*) is the highest, and the distance A from the light source 2 to the diffusion/reflection surface 3*a* at this position is the longest. Meanwhile, the light intensity of the light L at the position where the emission angle θ is the largest (an upper end of the diffusion/reflection surface 3*a*) is the weakest, and the distance B (shown by C in FIG. 4) from the light source 2 to the diffusion/reflection surface 3*a* at this position is the shortest.

In addition, as shown in FIG. 2A and FIG. 2B, the diffusion/reflection surface 3*a* has a curved surface shape that forms an arc about the optical axis AX in a cross section (hereinafter, referred to as "a horizontal cross section") in the other direction (in the embodiment, a horizontal direction of the reflector 3) perpendicular to the optical axis AX of the light L emitted from the light source 2 and perpendicular to the one direction.

That is, the diffusion/reflection surface 3*a* is constituted by a concave curved surface obtained by rotating the above-mentioned cosine curve about the optical axis AX. In addition, an angle α of the horizontal cross section of the diffusion/reflection surface 3*a* about the optical axis AX is set to a range of, for example, −45° to 45°. Further, the angle α can be appropriately changed according to the distance from the light source 2.

The reflector 3 has the diffusion/reflection surface 3*a*, a front surface side of which is open, reflects the light L that has entered the diffusion/reflection surface 3*a* while diffusing the light L, and emits the diffused light L toward the front surface side of the vehicle lamp 1. Accordingly, in the vehicle lamp 1 of the embodiment, it is possible to emit red light using the front surface side of the reflector 3 as a light emitting surface of a tail lamp.

In the vehicle lamp 1 of the embodiment having the above-mentioned configuration, as the diffusion/reflection surface 3*a* of the above-mentioned reflector 3 has a curved surface shape according to directionality of the light L emitted from the light source 2, luminance of the light L diffused and reflected by the diffusion/reflection surface 3*a* can be made uniform throughout the entire region of the diffusion/reflection surface 3*a*.

In addition, in the vehicle lamp 1 of the embodiment, by making the luminance of the light L diffused and reflected by the above mentioned diffusion/reflection surface 3*a* uniform, even when the viewing angle from the front view is increased, it is possible to make the light emitting surface of the tail lamp visible with the same brightness.

Further, in the vehicle lamp 1 of the embodiment, since there is no need to add a diffusion lens like in the related art, it is possible to reduce costs while minimizing increase in the number of parts.

Further, the present invention is not particularly limited to the configuration of the first embodiment, and various modifications may be made without departing from the scope of the present invention.

Figure 5:
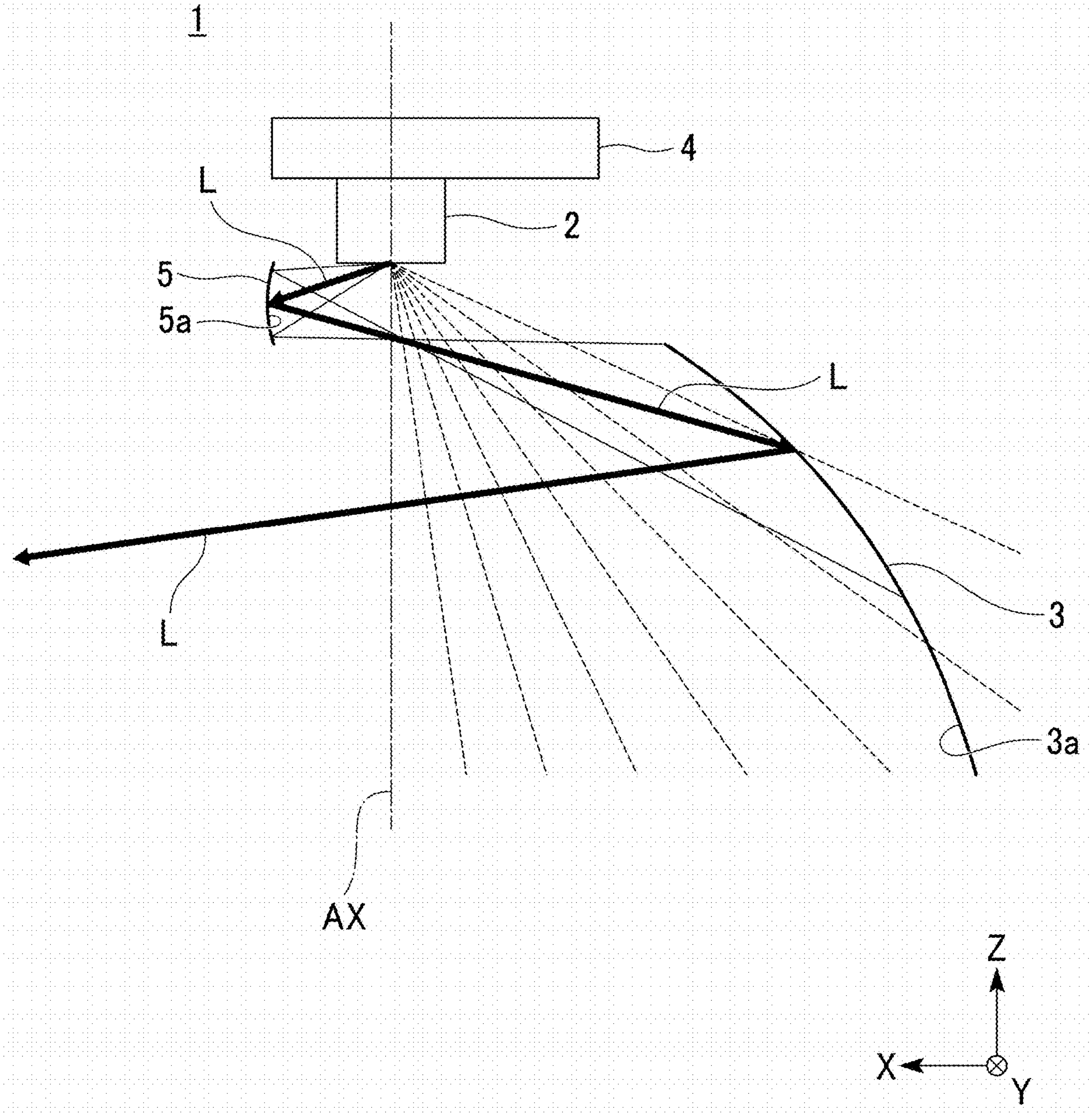
FIG. 5 is a cross-sectional view showing a configuration to which a subsidiary reflector is added.

Specifically, in the vehicle lamp 1, for example, a subsidiary reflector 5 as shown in FIG. 5 may be added. Further, FIG. 5 is a cross-sectional view showing a configuration in which the subsidiary reflector 5 is added to the vehicle lamp 1.

The subsidiary reflector 5 is disposed below the light source 2 and on the front surface side of the reflector 3, and has a reflecting surface 5*a* configured to reflect some of the light L emitted from the light source 2 toward the diffusion/reflection surface 3*a*. For example, a reflection member on which a reflecting film such as an aluminum deposition film or the like is used for the subsidiary reflector 5.

The reflecting surface 5*a* of the subsidiary reflector 5 is constituted by a concave free-form surface which is located on the front surface side with respect to the optical axis AX of the light L emitted from the light source 2 and which is located above the reflector 3 in the vertical cross section. In addition, the reflecting surface 5*a* has a curved surface shape that forms an arc about the optical axis AX in the horizontal cross section.

In the subsidiary reflector 5, a surface side of the reflecting surface 5*a* facing the reflector 3 is opened, and the subsidiary reflector 5 reflects the light L that has entered the reflecting surface 5*a* toward a range in which the emission angle θ of the diffusion/reflection surface 3*a* is increased.

Accordingly, in the vehicle lamp 1 of the embodiment, while complementing the luminance of the light L diffused and reflected within the range where the emission angle θ of the diffusion/reflection surface 3*a* is increased, the luminance of the light L diffused and reflected by the diffusion/reflection surface 3*a* can be made uniform over the entire area of the diffusion/reflection surface 3*a*.

Figure 6:
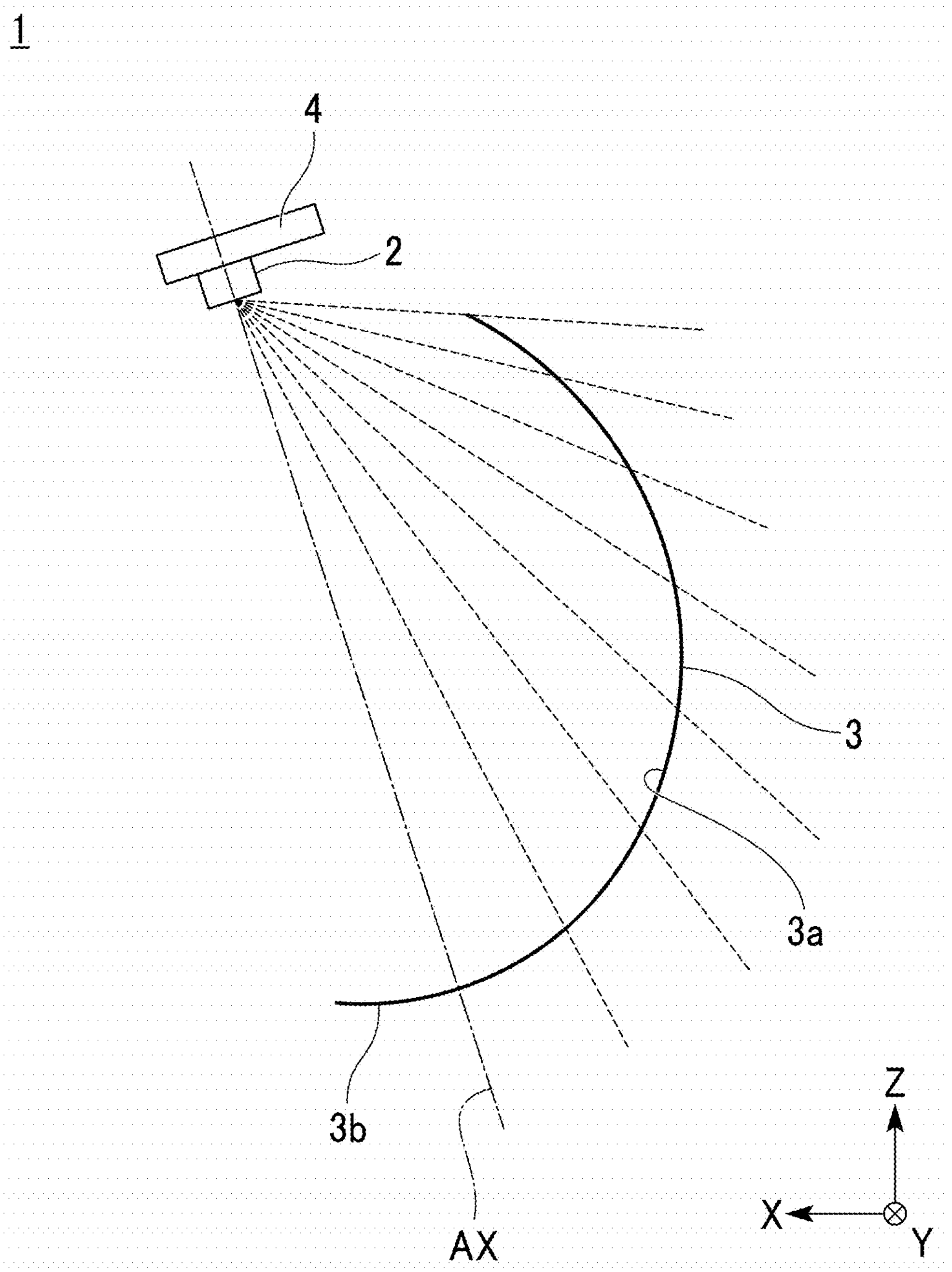
FIG. 6 is a cross-sectional view showing a configuration in which an optical axis of light emitted from the light source is inclined with respect to a vertical direction.

In addition, in the above-mentioned vehicle lamp 1, for example, as shown in FIG. 6, the optical axis AX of the light L emitted from the light source 2 may be inclined with respect to the vertical direction. Further, FIG. 6 is a cross-sectional view showing a configuration in which the optical axis AX of the light L emitted from the light source 2 is inclined with respect to the vertical direction.

Specifically, in the configuration shown in FIG. 6, the optical axis AX of the light L emitted from the light source 2 is inclined toward the back surface side rather than the vertical direction. Correspondingly, the diffusion/reflection surface 3*a* includes an extension portion 5*b* that forms a cosine curve according to the Lambertian light distribution toward the front surface side with respect to the optical axis AX of the light L emitted from the light source 2 in the vertical cross section. In addition, the extension portion 5*b* is extended such that the light L diffused and reflected toward the front surface side of the diffusion/reflection surface 3*a* is not interfered by the extension portion 5*b*.

Accordingly, in the vehicle lamp 1 of the embodiment, some of the light L advancing toward the front surface side with respect to the optical axis AX can be diffused and reflected by an extension portion 3*b* of the diffusion/reflection surface 3*a*, and the strong light L near the optical axis AX of the light L emitted from the light source 2 can be efficiently used.

Figure 7A:
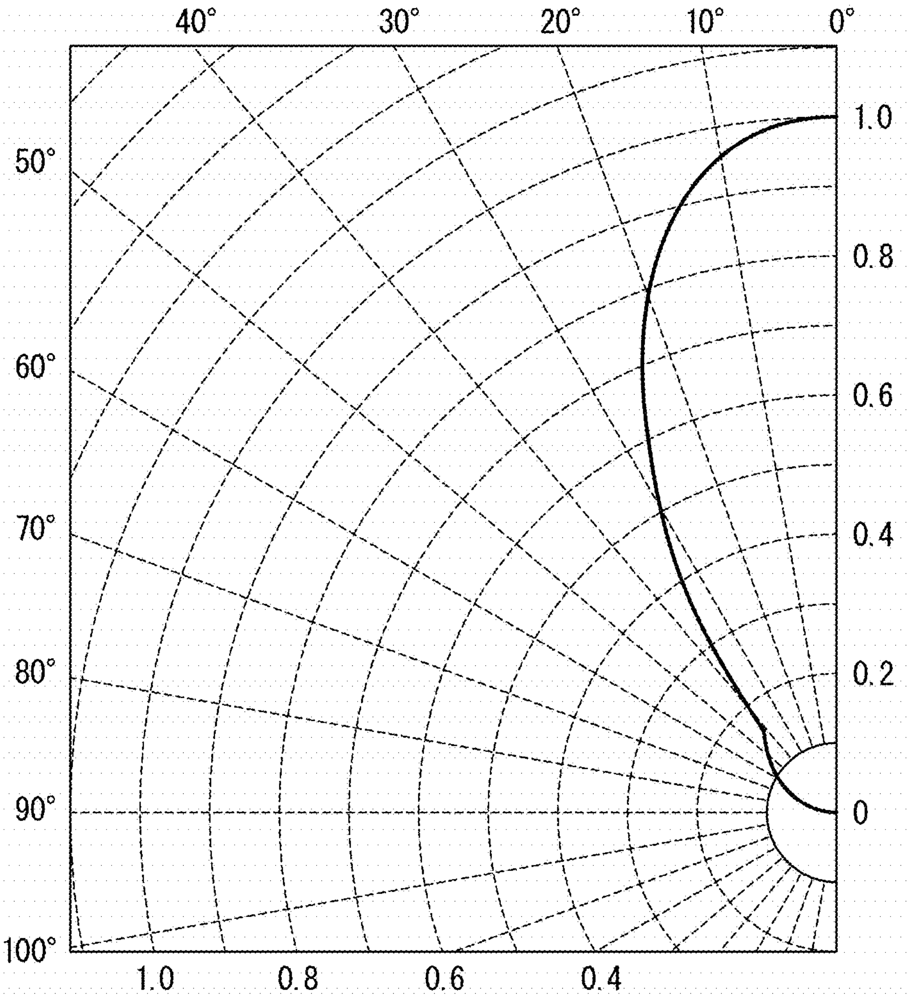
FIG. 7A is a graph showing another directionality of light emitted from the light source on polar coordinates.
Figure 7B:
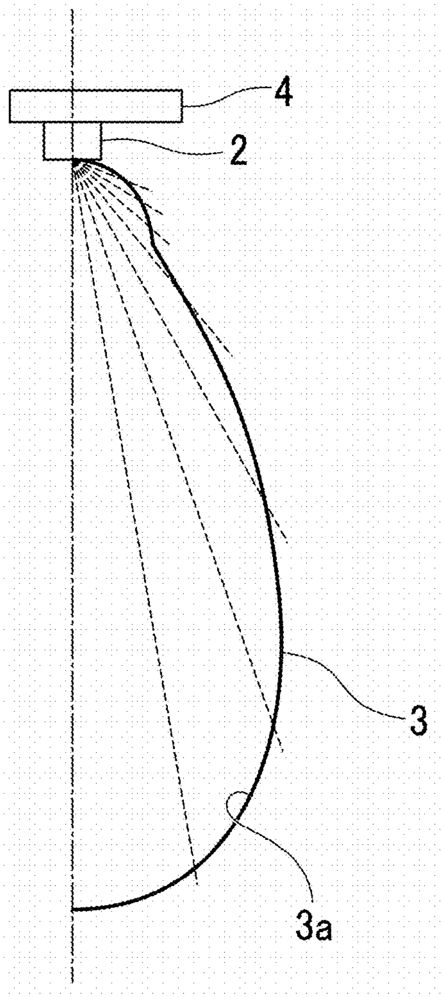
FIG. 7B is a cross-sectional view showing a shape of the diffusion/reflection surface of the reflector according to the directionality of the light shown in FIG. 7A.

In addition, in the vehicle lamp 1, for example, it is possible to make a curved surface shape of the diffusion/reflection surface 3*a* as shown in FIG. 7B according to the directionality of the light L emitted from the light source 2 shown in FIG. 7A. Further, FIG. 7A is a graph showing another directionality of the light L emitted from the light source 2 on polar coordinates. FIG. 7B is a cross-sectional view showing a shape of the diffusion/reflection surface 3*a* of the reflector 3 according to the directionality of the light shown in FIG. 7A.

That is, the diffusion/reflection surface 3*a* may have a curved surface shape that forms a curve according to the directionality of the light L emitted from the light source 2 in the vertical cross section, or a curved surface shape that approximates the curve.

Similarly, the diffusion/reflection surface 3*a* is not limited to a curved surface shape that forms an arc about the optical axis AX in the horizontal cross section, but may also be a curved surface shape that forms a curve that approximates the arc.

Figure 8:
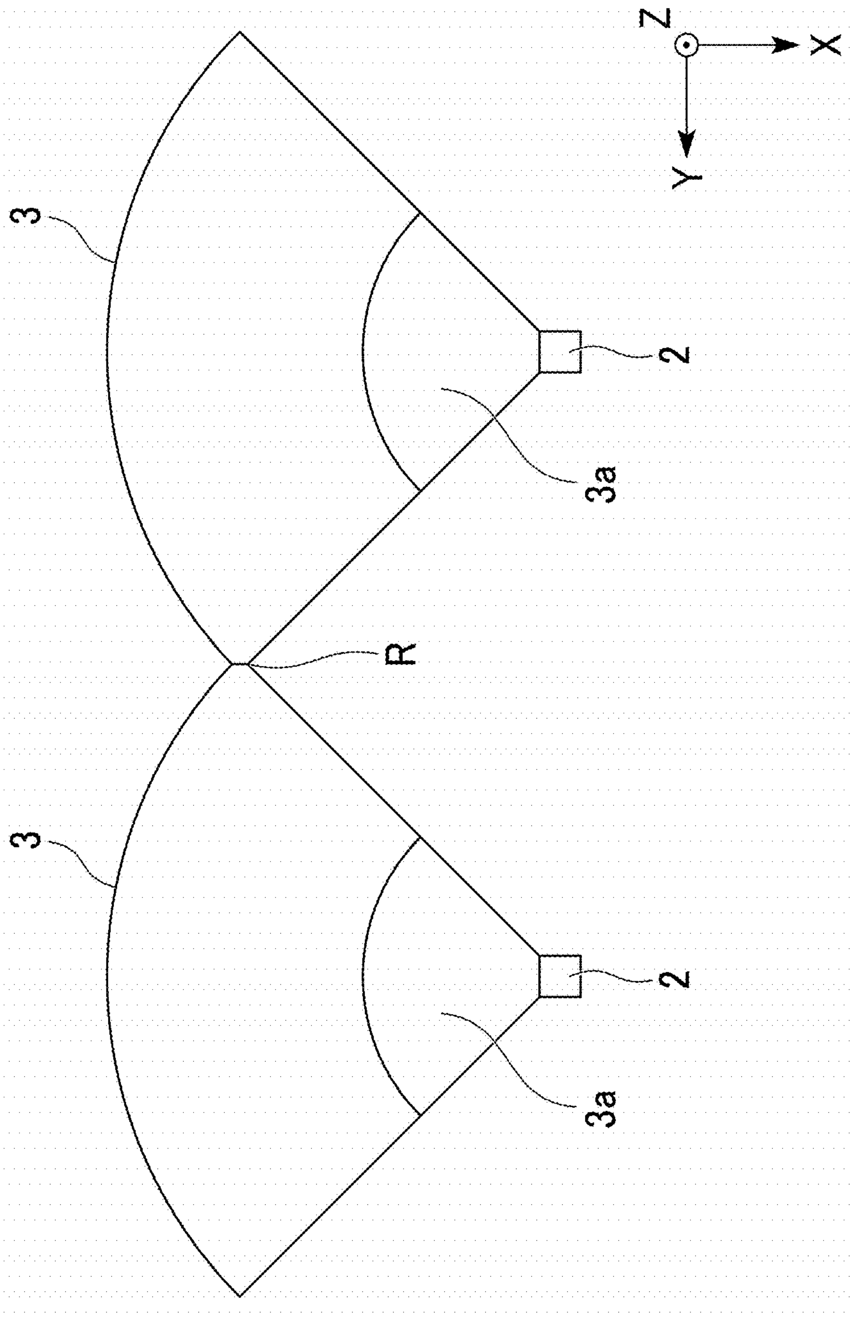
FIG. 8 is a plan view seeing from above a configuration in which a plurality of light sources and a plurality of reflectors are disposed next to each other.

In addition, as shown in FIG. 8, the vehicle lamp, to which the present invention is applied, may include, for example, a plurality of (in the example, two) light sources 2, and a plurality of (in the example, two) reflectors 3 disposed so as to correspond to the plurality of light sources 2, respectively. Further, FIG. 8 is a plan view seen from above a configuration in which the plurality of light sources 2 and the plurality of reflectors 3 are disposed next to each other.

However, in the case of the configuration, since the curved surface shape of the diffusion/reflection surface 3*a* is changed significantly at a boundary portion R between the neighboring diffusion/reflection surfaces 3*a*, the boundary portion R tends to cause dark areas of light emission.

Figure 9:
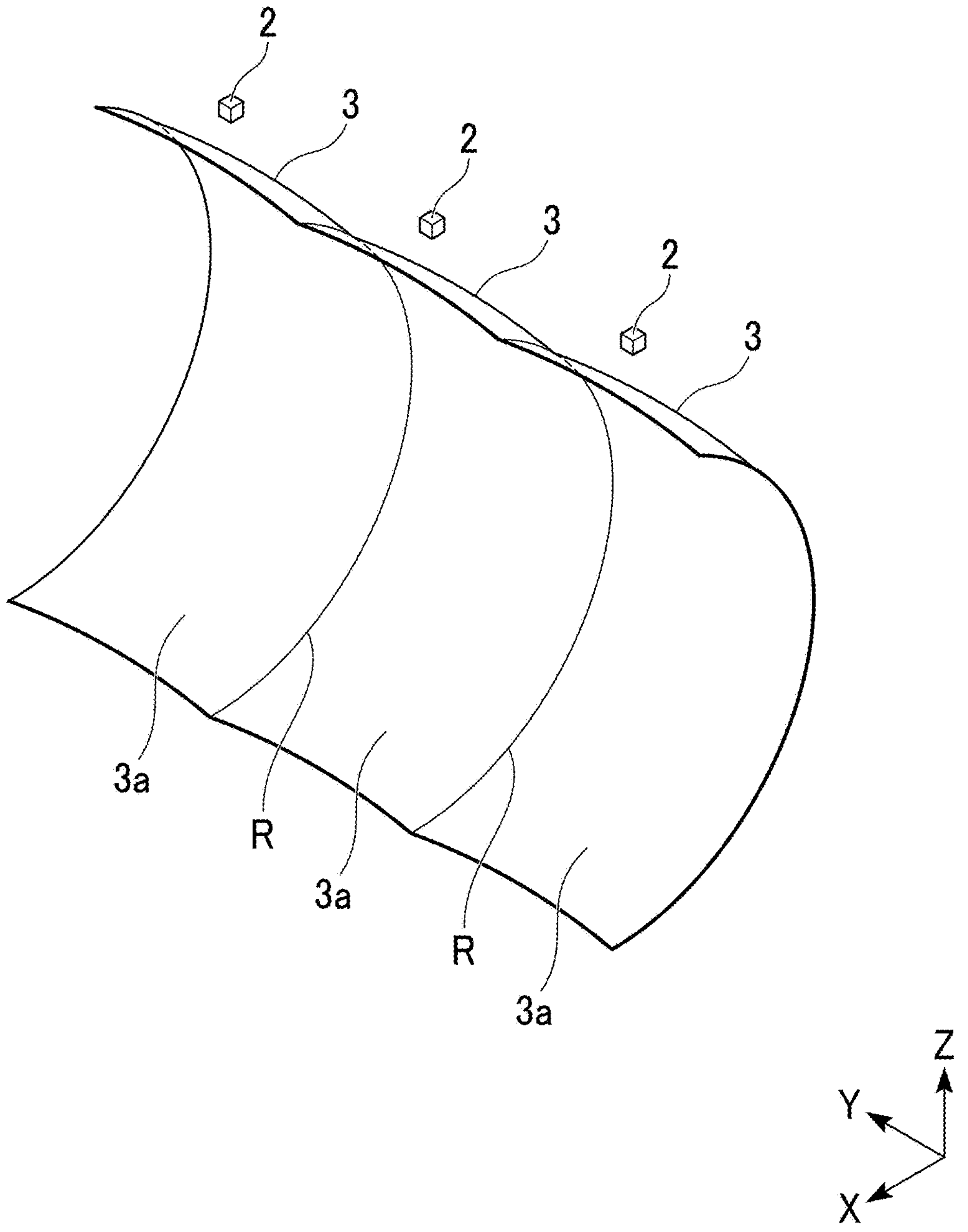
FIG. 9 is a perspective view showing a configuration of the reflector on which a plurality of diffusion/reflection surfaces are provided continuously.

On the other hand, for example, it may also be configured to include the reflector 30 in which the plurality of (in the example, three) diffusion/reflection surfaces 3*a* are continuously provided as shown in FIG. 9. Further, FIG. 9 is a perspective view showing a configuration of the reflector 30 in which the plurality of diffusion/reflection surfaces 3*a* are continuously provided.

In the case of the configuration, by increasing a curvature of the arc of the neighboring diffusion/reflection surfaces 3*a* in the horizontal cross section of the reflector 30, it is possible to reduce the shape change in the boundary portion R and suppress occurrence of dark areas in the boundary portion R.

Further, when the curvature of the arc of the neighboring diffusion/reflection surfaces 3*a* is increased, while the curved surface shape at the vertical cross section of each of the diffusion/reflection surfaces 3*a* toward the boundary portion R deviates from an ideal shape of a cosine curve, it is possible to achieve sufficient uniformity of light emission between the neighboring diffusion/reflection surfaces 3*a*.

Second Embodiment

Next, as a second embodiment of the present invention, for example, a vehicle lamp 10 shown in FIG. 10 and FIG. 11 will be described.

Figure 10:
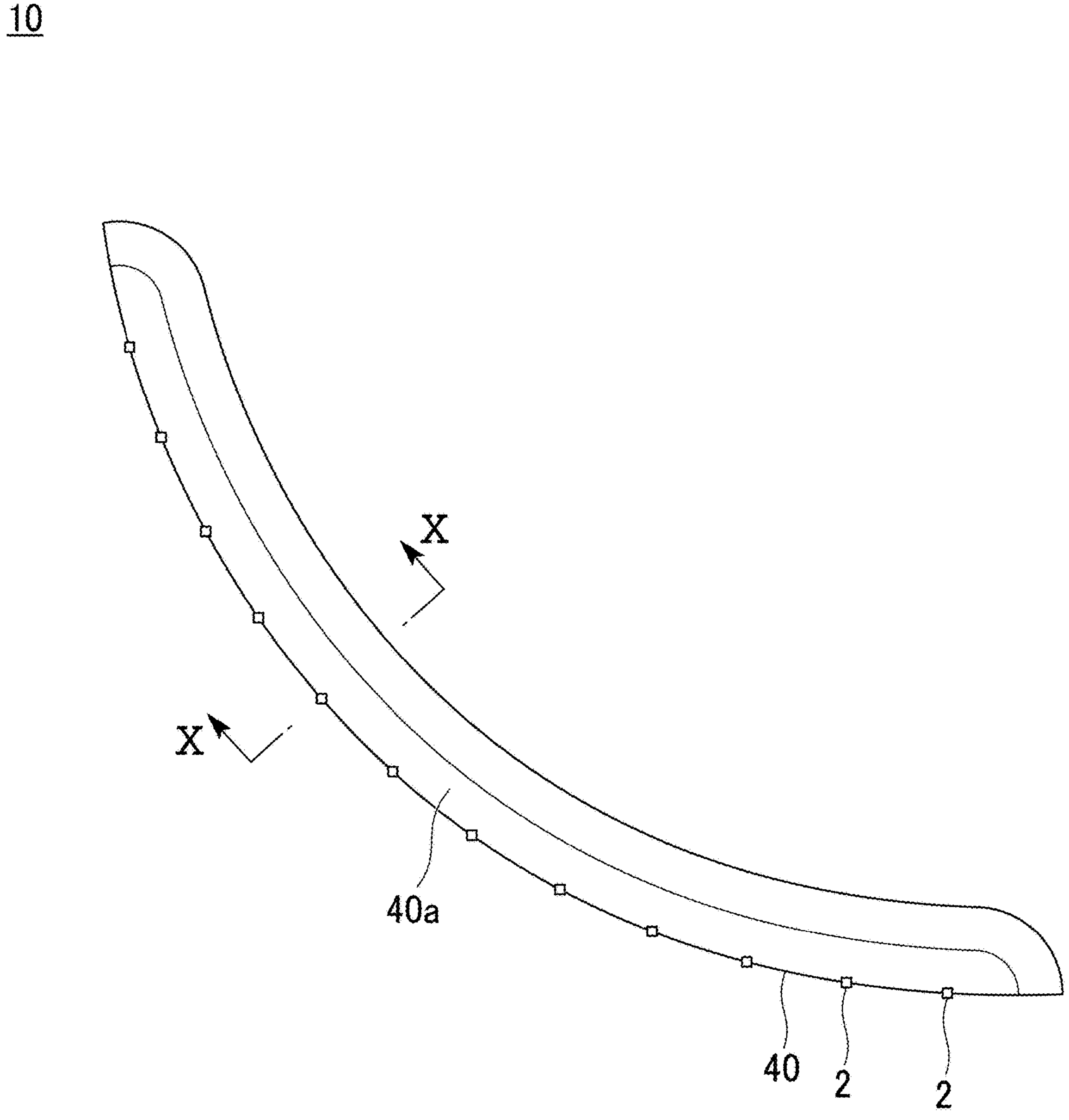
FIG. 10 is a plan view showing a configuration of a vehicle lamp according to a second embodiment of the present invention.

Further, FIG. 10 is a plan view showing a configuration of the vehicle lamp 10. FIG. 11 is a cross-sectional view of the vehicle lamp 10 along a line segment X-X shown in FIG. 10. In addition, in the following description, the same areas as in the vehicle lamp 1 are designated by the same reference signs in the drawings, and description thereof will be omitted.

Figure 11:
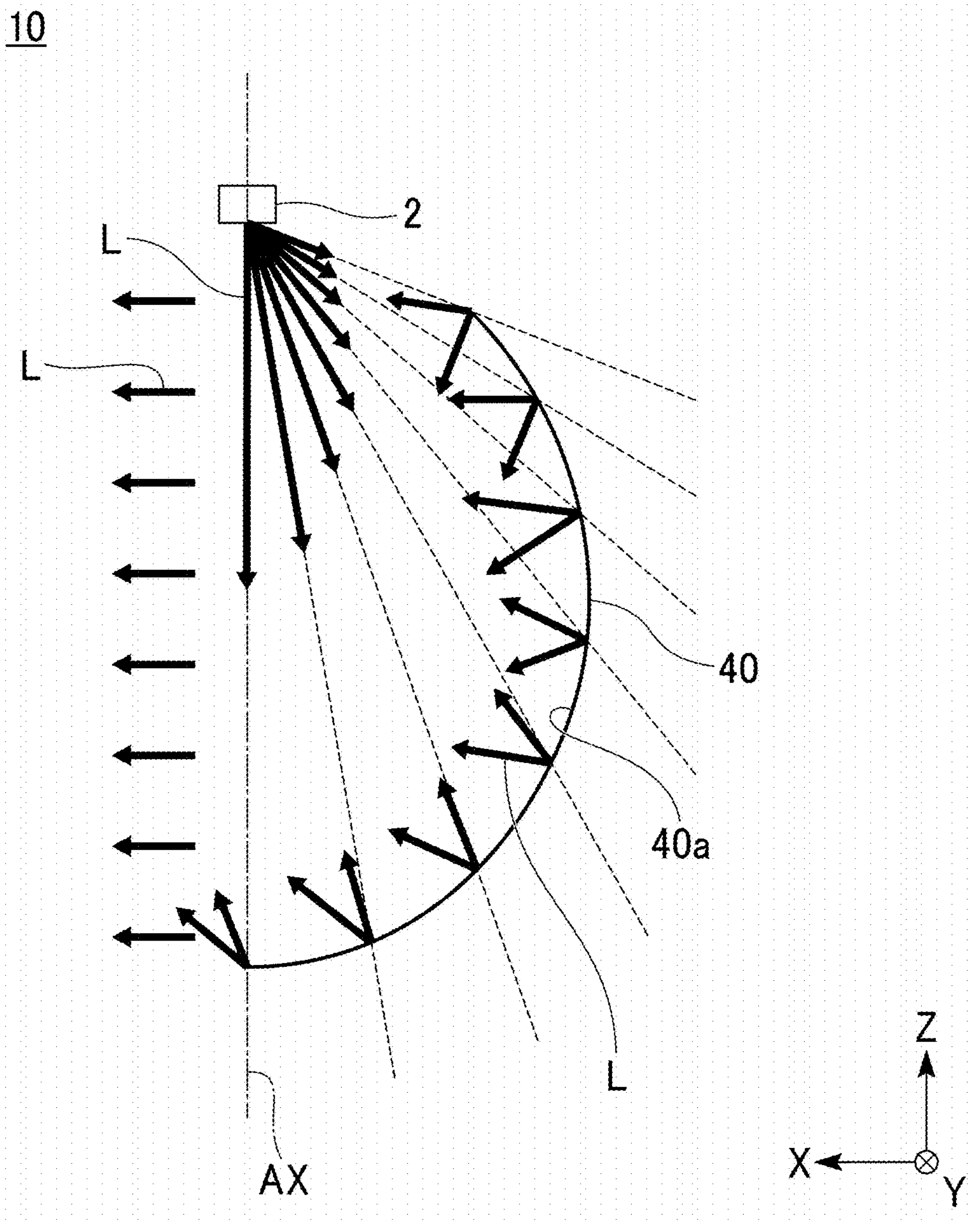
FIG. 11 is a cross-sectional view of the vehicle lamp along a line segment X-X shown in FIG. 10.

As shown in FIG. 10 and FIG. 11, the vehicle lamp 10 of the embodiment includes a plurality of (in the embodiment, 13) light sources 2, and a reflector 40, and is disposed inside a lighting body (not shown) that constitutes a rear combination lamp.

The reflector 40 is disposed below the plurality of light sources 2, and has a diffusion/reflection surface 40*a* configured to diffusing and reflecting the light L emitted from each of the light sources 2 toward the front surface side. For example, a reflection member having a light diffusion property such as a white glass epoxy resin or the like is used for the reflector 40. In addition, the diffusion/reflection surface 40*a* is constituted by a reflecting surface including a fine concavo-convex structure configured to randomly diffuse the light L, for example, embossing or the like.

In the vehicle lamp 10 of the embodiment, the diffusion/reflection surface 40*a* of the reflector 40 has a curved surface shape that forms a curve according to the directionality of the light L emitted from the light source 2 in a cross section of at least one direction along the optical axis AX of the light L emitted from each of the light sources 2 (in the embodiment, a vertical cross section along a vertical line from the light source 2 to the diffusion/reflection surface 40*a*).

Specifically, the diffusion/reflection surface 40*a* is constituted by a concave curve surface that forms each cosine curve in the vertical cross section corresponding to each of the light sources 2.

Meanwhile, the diffusion/reflection surface 40*a* has a surface shape curved in an arc shape in a widthwise direction of the vehicle (hereinafter, referred to as "a vehicle width direction") according to a slant shape applied to a corner portion of the rear end side of the vehicle in the horizontal cross section.

For this reason, although the diffusion/reflection surface 40*a* has an ideal shape of a cosine curve in the vertical cross section corresponding to each of the light sources 2 described above, it deviates from the ideal shape of the cosine curve between the light sources 2.

Meanwhile, since the diffusion/reflection surface 40*a* is continuous in the direction in which the light sources 2 are arranged, the boundary portion R between the neighboring diffusion/reflection surfaces 3*a* described above is not generated, and it is possible to sufficiently allow uniformity of light emission between the light sources 2.

Meanwhile, both ends of the diffusion/reflection surface 40*a* are constituted by concave curved surfaces obtained by rotating the cosine curve about the optical axis AX of the light sources 2 disposed at both ends. Accordingly, it is possible to provide ideal cosine curve shapes at both ends of the diffusion/reflection surface 40*a*.

In the reflector 40, the front surface side of the diffusion/reflection surface 40*a* is opened, the light L that has entered the diffusion/reflection surface 40*a* is diffused and reflected, and the light L diffused toward the front surface side of the vehicle lamp 10 is emitted. Accordingly, in the vehicle lamp 10 of the embodiment, it is possible to emit red light using the front surface side of the reflector 40 as the light emitting surface of the tail lamp.

In the vehicle lamp 10 of the embodiment of the above-mentioned configuration, since the diffusion/reflection surface 40*a* of the reflector 40 has a curved surface shape according to the directionality of the light L emitted from each of the light sources 2, it is possible to make the luminance of the light L diffused and reflected by the diffusion/reflection surface 40*a* uniform over the entire area of the diffusion/reflection surface 40*a*.

In addition, in the vehicle lamp 10 of the embodiment, by equalizing the luminance of the light L diffused and reflected by the diffusion/reflection surface 40*a* described above, even if the viewing angle in a front view is increased, it is possible to make the light emitting surface of the tail lamp visible with the same brightness.

Further, in the vehicle lamp 10 of the embodiment, since there is no need to add the diffusion lens like in the related art, it is possible to reduce costs while minimizing the increase in the number of parts.

Here, a light source image of the vehicle lamp 10 was obtained by simulation when the viewing angle with respect to the vehicle lamp 10 was 15°, 30°, and 45° outward in the vehicle width direction, and 10° above the vehicle. The light source images from the simulation results are shown in FIG. 12 to FIG. 15.

Figure 12:
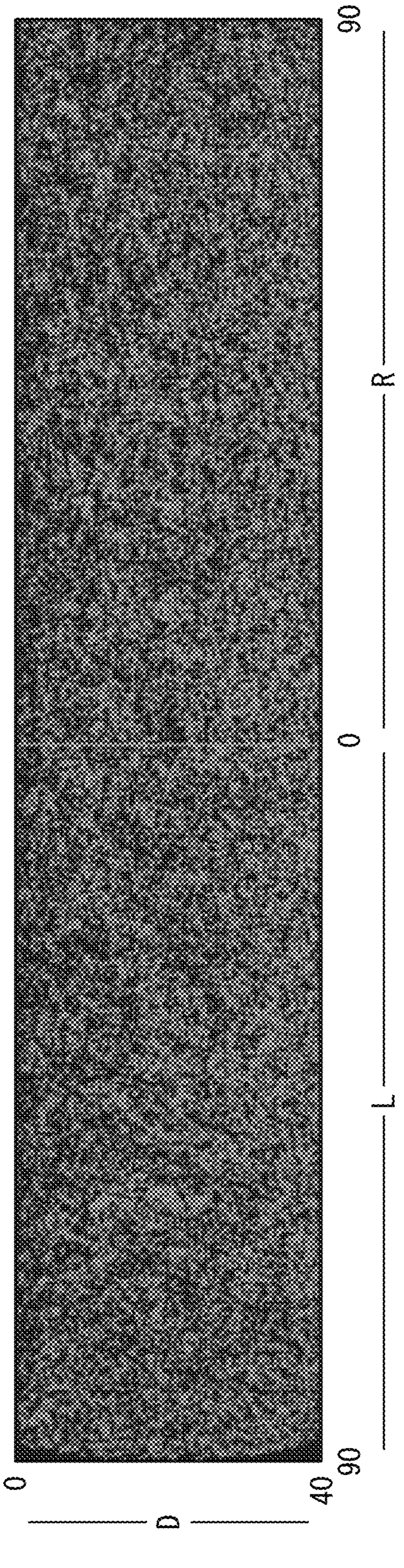
FIG. 12 is a photograph showing a light source image when a viewing angle with respect to the vehicle lamp shown in FIG. 10 is 15° outward in the vehicle width direction.
Figure 13:
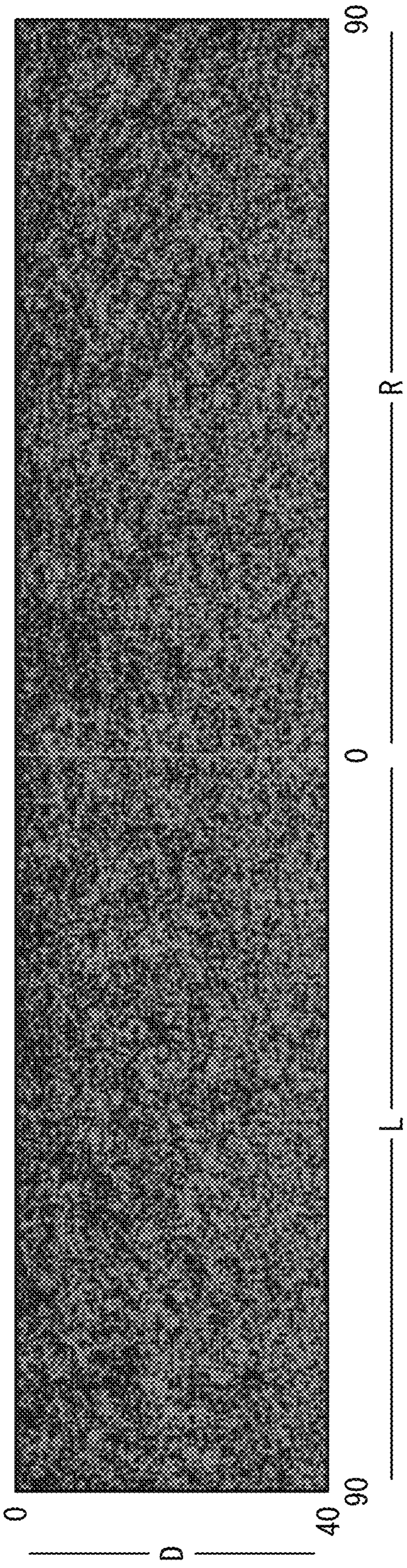
FIG. 13 is a photograph showing a light source image when a viewing angle with respect to the vehicle lamp shown in FIG. 10 is 30° outward in the vehicle width direction.
Figure 14:
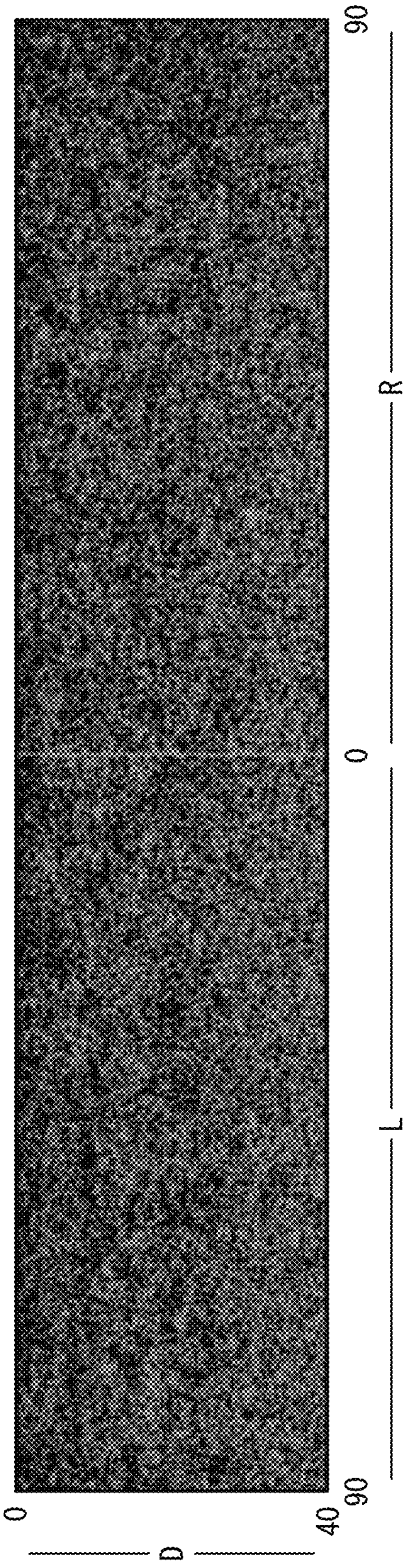
FIG. 14 is a photograph showing a light source image when a viewing angle with respect to the vehicle lamp shown in FIG. 10 is 45° outward in the vehicle width direction.
Figure 15:
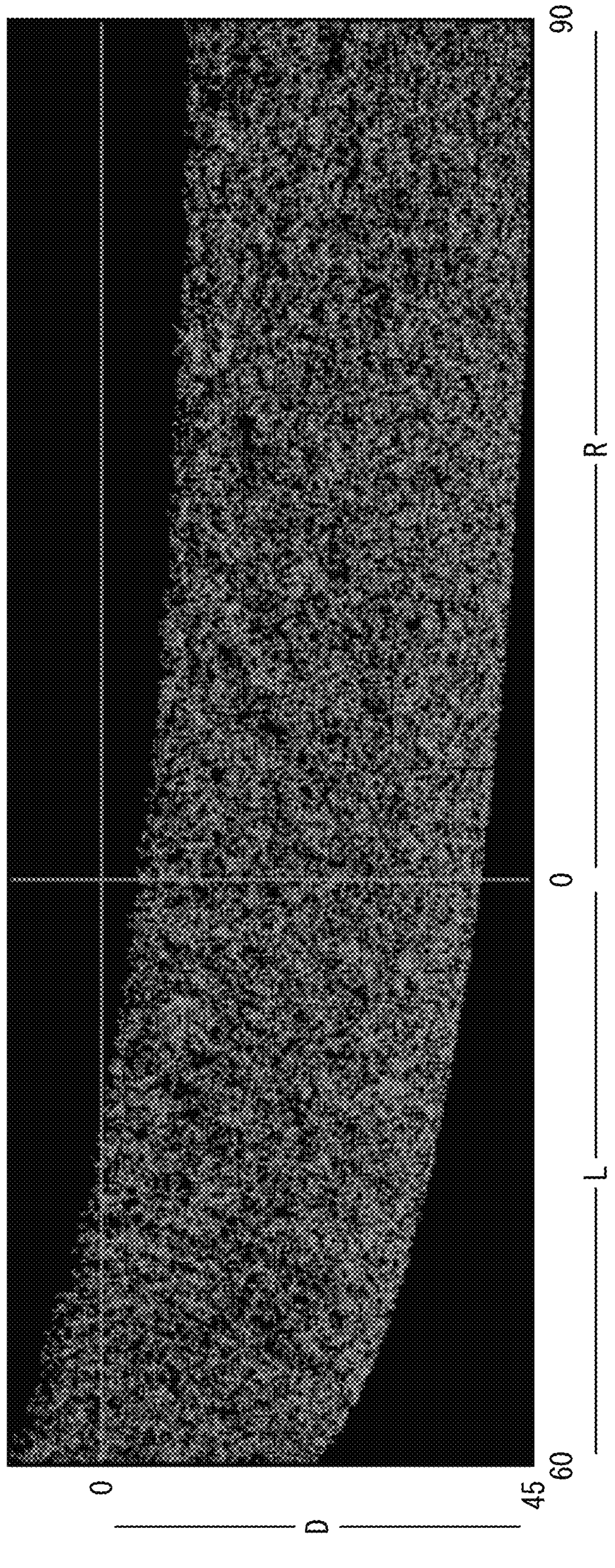
FIG. 15 is a photograph showing a light source image when a viewing angle with respect to the vehicle lamp shown in FIG. 10 is 10° upward from the vehicle.

Further, FIG. 12 is a photograph showing a light source image when a viewing angle with respect to the vehicle lamp 10 is 15° outward in the vehicle width direction. FIG. 13 is a photograph showing a light source image when a viewing angle with respect to the vehicle lamp 10 is 30° outward in the vehicle width direction. FIG. 14 is a photograph showing a light source image when a viewing angle with respect to the vehicle lamp 10 is 45° outward in the vehicle width direction. FIG. 15 is a photograph showing a light source image when a viewing angle with respect to the vehicle lamp 10 is 10° upward from the vehicle.

As shown in FIG. 12 to FIG. 15, even when the viewing angle with respect to the vehicle lamp 10 is changed, it is possible to obtain a more uniform light source image with the same brightness.

Further, the present invention is not necessarily limited to the configuration of the embodiment described above, and various changes may be made without departing from the scope of the present invention.

In the embodiment, while the case in which the present invention is applied to the tail lamp that constitutes the above-mentioned rear combination lamp has been exemplified, the vehicle lamp to which the present invention is applied is not limited to the above-mentioned rear-side vehicle lamp, and the present invention may also be applied to a front-side vehicle lamp.

That is, the vehicle lamp to which the present invention is applied is not limited to the above-mentioned tail lamp, but the present invention may be widely applied to a vehicle lamp including a light source and a reflector, for example, a stop lamp (brake lamp), a direction indicator (turn lamp), a back lamp, a lid lamp, a headlight for a vehicle (head lamp), a width indicator (position lamp), a subsidiary headlight (subsidiary head lamp), a front (rear) fog light (fog lamp), a daytime running lamp, or the like.

In addition, the color of the light emitted from the light source is not limited to the above-mentioned red light, but can be changed as appropriate, such as white light or orange light, depending on the use of the vehicle lamp.

Further, although the present invention is suitably used for the above-mentioned vehicle lamp, it is not necessarily limited to application to the vehicle lamp, and can also be applied to general lighting devices, such as residential lighting devices.

REFERENCE SIGNS LIST

1 . . . vehicle lamp 2 . . . light source 3 . . . reflector 3*a* . . . diffusion/reflection surface 4 . . . circuit board 5 . . . subsidiary reflector 5*a* . . . reflecting surface 10 . . . vehicle lamp 30 . . . reflector 40 . . . reflector 40*a* . . . diffusion/reflection surface L . . . light AX . . . optical axis

The invention claimed is:

1. A vehicle lamp comprising:

a light source; and a reflector including a diffusion/reflection surface configured to diffuse and reflect light emitted from the light source toward a front surface side, wherein directionality of light emitted from the light source is a Lambertian light distribution, wherein the diffusion/reflection surface has a concave curved surface shape that forms a cosine curve according to a directionality of light emitted from the light source in a cross section in at least one direction along an optical axis of the light emitted from the light source, wherein the cosine curve is a curve expressed by an equation $B=A\cos\theta$ in a case provided that:

a distance A is a distance from the light source to the diffusion/reflection surface when an emission angle of the light is 0°; and a distance B is a distance from the light source to the diffusion/reflection surface when the emission angle of the light is θ.

2. The vehicle lamp according to claim 1, wherein the diffusion/reflection surface has a curved surface shape that forms an arc about an optical axis of the light emitted from the light source or a curved surface shape that forms a curve approximate to the arc in a cross section in other direction which is perpendicular to the optical axis and which is perpendicular to the one direction.

3. The vehicle lamp according to claim 2, wherein the diffusion/reflection surface includes a fine concavo-convex structure.

4. The vehicle lamp according to claim 2, wherein a plurality of light sources are arranged side by side, the reflector includes a plurality of diffusion/reflection surfaces corresponding to the light sources, respectively, and the diffusion/reflection surfaces are provided continuously in a direction in which light sources are arranged.

5. The vehicle lamp according to claim 2, wherein the vehicle lamp is a tail lamp of a vehicle.

6. The vehicle lamp according to claim 1, wherein the reflector is constituted by a reflection member having a light diffusion ability.

7. The vehicle lamp according to claim 6, wherein the diffusion/reflection surface includes a fine concavo-convex structure.

8. The vehicle lamp according to claim 6, wherein a plurality of light sources are arranged side by side, the reflector includes a plurality of diffusion/reflection surfaces corresponding to the light sources, respectively, and the diffusion/reflection surfaces are provided continuously in a direction in which light sources are arranged.

9. The vehicle lamp according to claim 6, wherein the vehicle lamp is a tail lamp of a vehicle.

10. The vehicle lamp according to claim 1, wherein the diffusion/reflection surface includes a fine concavo-convex structure.

11. The vehicle lamp according to claim 10, wherein a plurality of light sources are arranged side by side, the reflector includes a plurality of diffusion/reflection surfaces corresponding to the light sources, respectively, and the diffusion/reflection surfaces are provided continuously in a direction in which light sources are arranged.

12. The vehicle lamp according to claim 10, wherein the vehicle lamp is a tail lamp of a vehicle.

13. The vehicle lamp according to claim 1, wherein a plurality of light sources are arranged side by side, the reflector includes a plurality of diffusion/reflection surfaces corresponding to the light sources, respectively, and the diffusion/reflection surfaces are provided continuously in a direction in which light sources are arranged.

14. The vehicle lamp according to claim 1, wherein the vehicle lamp is a tail lamp of a vehicle.

* * * * *